United States Patent [19]
Berthaud et al.

[11] Patent Number: 5,815,492
[45] Date of Patent: Sep. 29, 1998

[54] DYNAMIC BANDWIDTH ESTIMATION AND ADAPTATION IN HIGH SPEED PACKET SWITCHING NETWORKS

[75] Inventors: Jean-Marc Berthaud, Villeneuve-Loubet; Pierre-Andre Foriel, St. Laurent du Var; Claude Galand, Cagnes sur Mer; Stephane Lengelle, Antibes; Laurent Nicolas, Villeneuve Loubet, all of France

[73] Assignee: International Business Machines Corporation, Armonk, N.Y.

[21] Appl. No.: 807,499

[22] Filed: Feb. 27, 1997

[30] Foreign Application Priority Data

Jun. 20, 1996 [EP] European Pat. Off. .............. 96480087

[51] Int. Cl.$^6$ ....................................................... H04J 3/14
[52] U.S. Cl. ............................................................. 370/234
[58] Field of Search ..................................... 370/234, 230, 370/232, 253

[56] References Cited

U.S. PATENT DOCUMENTS 5,280,470  1/1994  Buhrke et al. ........................... 370/232
5,311,513  5/1994  Ahmadi et al. ......................... 370/230
5,359,593  10/1994 Derby et al. ............................ 370/234
5,434,848  7/1995  Chimento, Jr. et al. ................ 370/232

Primary Examiner—Chi H. Pham
Assistant Examiner—W. Todd Baker

[57] ABSTRACT

Method and system for adapting access to a packet switching network including a dynamic bandwidth adjustment mechanism which continuously monitors the mean bit rate of the signal source and the loss probability of the connection. These values are filtered to remove noise and then used to test whether the values fall within a pre-defined acceptable adaptation region in the mean bit rate, loss probability plane. Values falling outside of this region trigger bandwidth adaptation procedures which, in turn, result in acquiring a new connection bandwidth, and determining new parameters for the adaptation mechanism. Furthermore, the mechanism controls the number of connections that can be adapted by a single processor, given its processing capability. It ensures fairness between the connections in the sense that it prevents a single connection from using, on the average, a greater portion of the processor capacity than it should.

6 Claims, 7 Drawing Sheets

CONNECTION REQUEST MESSAGE (PRIOR ART)

DYNAMIC BANDWIDTH ESTIMATION AND ADAPTATION IN HIGH SPEED PACKET SWITCHING NETWORKS

TECHNICAL FIELD

The present invention relates to traffic management in high speed transmission networks, in particular to a method and system for monitoring traffic, for filtering traffic measurement and dynamically adjusting bandwidth allocated to connections.

BACKGROUND ART

Technology and Market Trends

The evolution of the telecommunications in general and of the packet switching networks in particular is driven by many factors among which two of them worth emphasizing: technologies and applications. Communication technologies have realized these last years considerable progress with:

the maturing of new transmission media and specially of optical fiber. High speed rates can now be sustained with very low bit error rates.

the universal use of digital technologies within private and public telecommunications networks.

The increase in communication capacity is generating more attractive tariffs and large bandwidths are economically more and more attractive. On the other hand, in relation with these new emerging technologies, many potential applications that were not possible before are now becoming accessible and attractive. In this environment, three generic requirements are expressed by the users:

improving old applications, optimizing communication networks, doing new applications.

High Speed Packet Switching Networks

Data transmission is now evolving with a specific focus on applications and by integrating a fundamental shift in the customer traffic profile. Driven by the growth of workstations, the local area networks interconnection, the distributed processing between workstations and super computers, the new applications and the integration of various and often conflicting structures—hierarchical versus peer to peer, wide versus local area networks, voice versus data—the data profile has become more bandwidth consuming, bursting, non-deterministic and requires more connectivity. Based on the above, there is strong requirement for supporting distributed computing applications across high speed networks that can carry local area network communications, voice, video, and traffic among channel attached hosts, business, engineering workstations, terminals, and small to intermediate file servers. This vision of a high speed multi-protocol network is the driver for the emergence of fast packet switching networks architectures in which data, voice, and video information is digitally encoded, chopped into small packets and transmitted through a common set of nodes and links.

An efficient transport of mixed traffic streams on very high speed lines means for these new network architectures a set of requirements in term of performance and resource consumption which can be summarized as follows:

very large flexibility to support a wide range of connectivity options, very high throughput and a very short packet processing time, efficient flow and congestion control.

Connectivity

In high speed networks, the nodes must provide a total connectivity. This includes attachment of the user's devices, regardless of vendor or protocol, and the ability to have the end user communicate with any other device. The network must support any type of traffic including data, voice, video, fax, graphic or image. Nodes must be able to take advantage of all common carrier facilities and to be adaptable to a plurality of protocols. All needed conversions must be automatic and transparent to the end user.

Throughput and Processing Time

One of the key requirement of high speed packet switching networks is to reduce the end-to-end delay in order to satisfy real time delivery constraints and to achieve the necessary high nodal throughput for the transport of voice and video. Increases in link speeds have not been matched by proportionate increases in the processing speeds of communication nodes and the fundamental challenge for high speed networks is to minimize the packet processing time within each node. In order to minimize the processing time and to take full advantage of the high speed/low error rate technologies, most of the transport and control functions provided by the new high bandwidth network architectures are performed on an end-to-end basis. The flow control and particularly the path selection and bandwidth management processes are managed by the access points of the network which reduces both the awareness and the function of the intermediate nodes.

Congestion and Flow Control

Communication networks have at their disposal limited resources to ensure an efficient packets transmission. An efficient bandwidth management is essential to take full advantage of a high speed network. While transmission costs per byte continue to drop year after year, transmission costs are likely to continue to represent the major expense of operating future telecommunication networks as the demand for bandwidth increases. Thus considerable efforts have been spent on designing flow and congestion control processes, bandwidth reservation mechanisms, routing algorithms to manage the network bandwidth.

An ideal network should be able to transmit an useful traffic directly proportional to the traffic offered to the network and this as far as the maximum transmission capacity is reached. Beyond this limit, the network should operate at its maximum capacity whatever the demand is. In the reality, the operations diverge from the ideal for a certain number of reasons which are all related to the inefficient allocation of resources in overloaded environment. For the operating to be satisfactory, the network must be implemented so as to avoid congestion. The simplest solution obviously consists in over-sizing the equipment so as to be positioned in an operating zone which is distant from the congestion. This solution is generally not adopted for evident reasons of costs and it is necessary to apply a certain number of preventive measures among which the main ones are:

the flow control for regulating the emitting data rate of the calling subscriber at a rate compatible with what the receiver can absorb.

the load regulation for globally limiting the number of packets present in the network to avoid an overloading of the resources, and the load balancing for fairly distributing the traffic over all the links of the network to avoid a local congestion in particular resources.

Congestion Control

Traffic Characteristics

In order to avoid congestion and insure adequate traffic flow in packet communication networks, it is common to control the access of packet sources to the network on an ongoing basis. In order to successfully control traffic access, it is necessary, first, to accurately characterize the traffic so as to provide appropriate bandwidth for carrying that traffic. Simple measurements which provide accurate estimates of the bandwidth requirements of a source are taught in U.S. Pat. No. 5,274,625 entitled "A Method for Capturing Traffic Behavior with Simple Measurements" (Derby et al.). In this application, the parameters used to characterize traffic are:

R, the peak bit rate of the incoming traffic in bits per second, m, the mean bit rate of the incoming traffic in bits per second, and b, the mean burst duration of the traffic in seconds.

Rather than using the actual burst duration, however, a so-called "exponential substitution" technique is used to calculate equivalent burst duration which would produce the same packet loss probability if the traffic were a well-behaved, exponentially distributed, on/off process. For traffic widely differing from such an exponential process, this equivalent burst duration produces a much more accurate characterization of the actual traffic and therefore permits a higher density of traffic on the same transmission facilities.

Leaky Bucket

The measured parameters are used to control the access of signal sources to the network when the actual traffic behavior departs significantly from the initial assumptions. A leaky bucket mechanism is one technique for controlling access to the network when the traffic exceeds the initial assumptions, but yet permits transparent access to the network when the traffic remains within these initial assumptions. One such leaky bucket mechanism is shown in U.S. Pat. No. 5,311,513 entitled "Rate-based Congestion Control in Packet Communications Networks" (Ahmadi et al.). More particularly, the leaky bucket mechanism prevents saturation of the network by low priority packets by limiting the number of low priority packets which can be transmitted in a fixed period of time while imposing a minimum on the number of red packets transmitted at a given time. Such leaky bucket control mechanisms optimize the low priority throughput of the packet network. High priority traffic, of course, is transmitted with little or no delay in the leaky bucket mechanism.

Traffic Monitoring

The above-described mechanisms are suitable for controlling traffic only if said traffic is reasonably well-behaved and remains within the general vicinity of the initially assumed traffic parameters. The traffic management system, however, must be structured to deal with traffic which is not well-behaved and which departs substantially from the initially assumed traffic parameters. If such a departure persists for any significant length of time, a new connection bandwidth must be assigned to the connection to accommodate the new traffic parameters. Such adaptation of the control system to radical changes in traffic behavior presents the problems of filtering the traffic measurements to separate transient changes of traffic behavior from longer term changes, and determining reasonable ranges within which the initially assumed traffic parameters can be maintained and outside of which new connection bandwidths must be requested. A bandwidth too large for the actual traffic is wasteful of connection resources while a bandwidth too small results in excessive packet loss. Ancillary problems include reasonable ease in implementation of the adaptation process and reasonable computational requirements in realizing the implementation.

Bandwidth Measurement and Adaptation

U.S. Pat. No. 5,359,593 entitled "Dynamic Bandwidth Estimation and Adaptation for Packet Communication Networks" (Derby et al.) discloses a dynamic adaptation of a traffic control system to changes in the traffic parameters by defining a region within which adaptation is not required and outside of which a new bandwidth allocation must be requested. In particular, the bandwidth requirement is adjusted:

upward if the measurements indicate that either a desired maximum packet loss probability will be exceeded or if the traffic on that connection will start to unfairly interfere with other connections sharing the transmission facilities.

downward if significant bandwidth savings can be realized for both the user of the connection and for the balance of the network, without violating any quality of service guarantees for all of the connections.

These limits on the adaptation region are converted to values of effective mean burst duration b and mean bit rates m. The measured effective mean burst duration and mean bit rates are then filtered to insure that the filtered values are statistically reliable, i.e., that a sufficient number of raw measurements are involved to insure a preselected confidence level in the results. This minimum number of raw measurements, in turn, determines the amount of time required to collect the raw measurements, given the mean bit rate of the traffic. This measurement time can be used to measure not only the statistics of the incoming data stream to the leaky bucket, but also the effect of the leaky bucket on the incoming traffic. This latter measurement allows a measure of how well the leaky bucket is dealing with variances in the offered traffic and hence the packet loss probability. When the traffic parameters fall outside of the desired adaptation region, a new connection with a different bandwidth is requested in order to accommodate the changes in the traffic parameters.

The adaptation mechanism disclosed in U.S. Pat. No. 5,359,593 entitled "Dynamic Bandwidth Estimation and Adaptation for Packet Communication Networks" (Derby et al.) insures a continuously reasonable traffic management strategy when the offered traffic variations are small and slow. However, this mechanism presents some limitations when the traffic variations become more important and faster. Then, the adaptation mechanism requires a longer time to converge resulting in an over or under reservation of the bandwidth on the network.

A second limitation of the adaptation mechanism appears when more than one connection is monitored by a single processor which is usually the case in practice. Some connections may require more bandwidth adaptation than other connections within a given time period. The limited processing power of the processor may result in a lack of fairness which might be detrimental to the other connections.

SUMMARY OF THE INVENTION

It is therefore an object of the present invention to improve the mechanism disclosed in U.S. Pat. No. 5,359,593 in order to dynamically estimate and adapt the bandwidth for large and fast traffic variations.

It is a further object to control the adaptation of multiple connections and to ensure fairness between all connection supported by a same processor.

The present invention relates to a method and system of dynamically adapting access to a packet switching communication network comprising a plurality of nodes interconnected with transmission links for the transmission of digital traffic from source nodes to destination nodes, each node comprising one or a plurality of link processors for processing one or a plurality of links, said method comprising the steps of:

measuring the mean bit rate of traffic from said source node, controlling the flow of said traffic from said source node into the network by means of a leaky bucket control circuit, measuring the loss probability of packets introduced into said network by said leaky bucket control circuit, filtering said loss probability measurements, defining adaptation regions on the values of said simultaneous mean bit rate and loss probability measurements, in response to pairs of said mean bit rate and loss probability measurements falling outside said adaptation regions, requesting a modification of the bandwidth allocated to connections from said source node, said step of requesting a modification of the bandwidth comprising the further steps of:

measuring an average number of bandwidth modification requests for each link processor within the source node, adapting, for all connections processed by the same processor within the source node, the bandwidth of the loss probability measurements' low pass filter according to the average number of bandwidth modification requests.

DESCRIPTION OF THE PREFERRED EMBODIMENT

High Speed Communications

Figure 2:
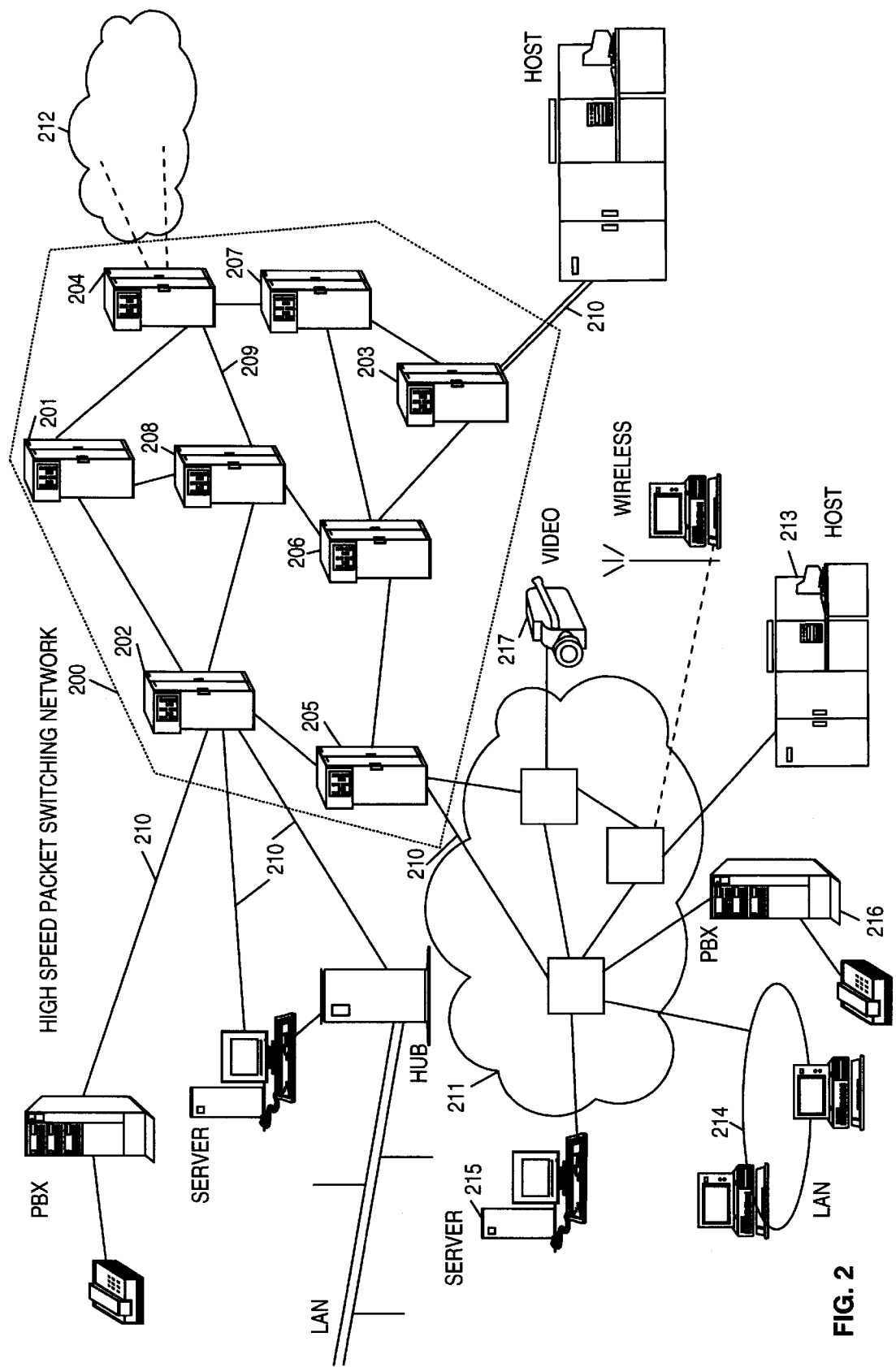
FIG. 2 shows a typical model of high speed packet switching network including the nodes claimed in the present invention.

As illustrated in FIG. 2, a typical model of communication system is made of several user networks (212) communicating through a high performance network (200) using private lines, carrier provided services, or public data networks. Each user network can be described as a set of communication processors and links (211) interconnecting large computers used as enterprise servers (213), user groups using workstations or personal computers attached on LAN (Local Area Networks 214), applications servers (215), PBX (Private Branch exchange 216) or video servers (217). These user networks, dispersed in different establishments, need to be interconnected through wide area transport facilities and different approaches can be used for organizing the data transfer. Some architectures involve the checking for data integrity at each network node, thus slowing down the transmission. Others are essentially looking for a high speed data transfer and to that end the transmission, routing and switching techniques within the nodes are optimized to process the flowing packets towards their final destination at the highest possible rate. The present invention belongs essentially to the latter category and more particularly to the fast packet switching network architecture detailed in the following paragraphs.

High Performance Packet Switching Networks

The general view in FIG. 2 shows a fast packet switching transmission system comprising eight nodes (201 to 208) each node being interconnected by means of high speed communication lines called Trunks (209). The access (210) to the high speed network by the users is realized through Access Nodes (202 to 205) located at the periphery. These Access Nodes comprise one or more Ports, each one providing an access point for attaching external devices supporting standard interfaces to the network and performing the conversions required to transport the users data flow across the network from and to other external devices. As example, the Access Node 202 interfaces respectively a Private Branch exchange (PBX), an application server and a hub through three Ports and communicates through the network by means of the adjacent Transit Nodes 201, 206 and 208.

Switching Nodes

Each network node (201 to 208) includes a Routing Point where the incoming data packets are selectively routed on the outgoing Trunks towards the neighboring Transit Nodes. Such routing decisions are made according to the information contained in the header of the data packets. In addition to the basic packet routing function, the network nodes also provide ancillary services such as:

the determination of routing paths for packets originated in the node, directory services like retrieving and updating information about network users and resources, the maintaining of a consistent view of the physical network topology, including link utilization information, and the reservation of resources at access points of the network.

Each Port is connected to a plurality of user processing equipment, each user equipment comprising either a source of digital data to be transmitted to another user system, or a data sink for consuming digital data received from another user system, or, typically, both. The interpretation of the users protocols, the translation of the users data into packets formatted appropriately for their transmission on the packet network (200) and the generation of a header to route these packets are executed by an Access Agent running in the Port. This header is made of Control and Routing Fields.

- The Routing Fields contain all the information necessary to route the packet through the network (200) to the destination node to which it is addressed. These fields can take several formats depending on the routing mode specified (connection oriented or connectionless routing mode).
- The Control Fields include, among other things, an encoded identification of the protocol to be used in interpreting the Routing Fields.

Routing Points

Figure 3:
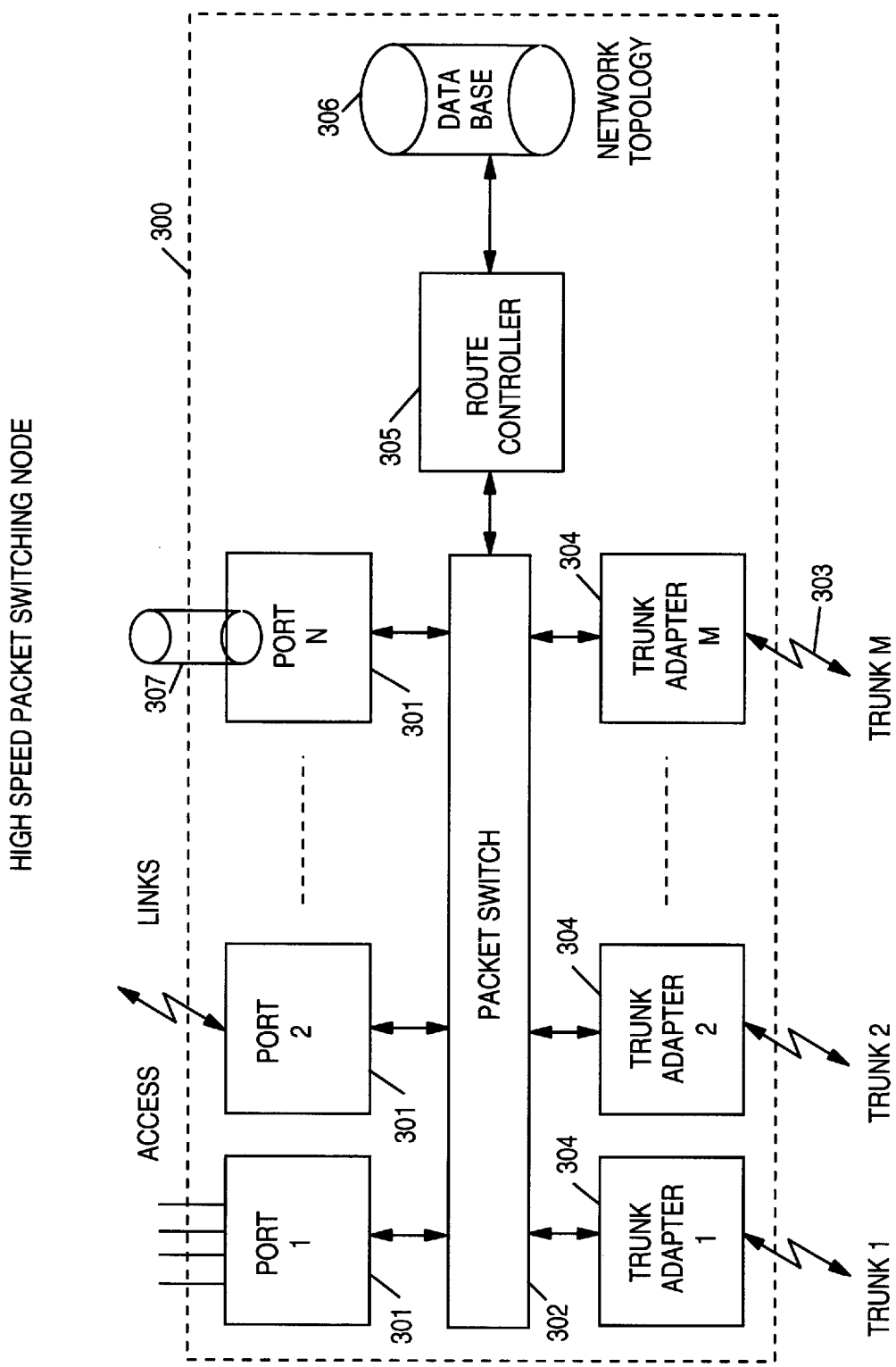
FIG. 3 describes a high speed node according to the present invention.

FIG. 3 shows a general block diagram of a typical Routing Point (300) such as it can be found in the network nodes (201 to 208) illustrated in FIG. 2. A Routing Point comprises a high speed packet Switch (302) onto which packets arriving at the Routing Point are entered. Such packets are received:

- from other nodes over high speed transmission links (303) via Trunk Adapters (304).
- from users via application adapters called Ports (301).

Using information in the packet header, the adapters (304, 301) determine which packets are to be routed by means of the Switch (302) towards a local user network (307) or towards a transmission link (303) leaving the node. The adapters (301 and 304) include queuing circuits for queuing packets prior to or subsequent to their launch on the Switch (302).

The Route Controller (305) calculates the optimum paths through the network (200) so as to satisfy a given set of quality of service specified by the user and to minimize the amount of network resources used to complete the communication path. Then, it builds the header of the packets generated in the Routing Point. The optimization criterion includes the number of intermediate nodes, the characteristics of the connection request, the capabilities and the utilization of the Trunks in the path, the quality of service specified for this connection . . .

All the information necessary for the routing, about the nodes and transmission links connected to the nodes, are contained in a Network Topology Database (306). Under steady state conditions, every Routing Point has the same view of the network. The network topology information is updated when new links are activated, new nodes added to the network, when links or nodes are dropped or when link loads change significantly. Such information is originated at the network node to which the resources are attached and is exchanged by means of control messages with all other Path Servers to provide the up-to-date topological information needed for path selection (such database updates are carried on packets very similar to the data packets exchanged between end users of the network). The fact that the network topology is kept current in every node through continuous updates allows dynamic network reconfigurations without disrupting end users logical connections (sessions).

The incoming transmission links to the packet Routing Point may comprise links from external devices in the local user networks (210) or links (Trunks) from adjacent network nodes (209). In any case, the Routing Point operates in the same manner to receive each data packet and forward it on to another Routing Point as dictated by the information in the packet header. The fast packet switching network operates to enable a communication between any two end user applications without dedicating any transmission or node facilities to that communication path except for the duration of a single packet. In this way, the utilization of the communication facilities of the packet network is optimized to carry significantly more traffic than would be possible with dedicated transmission links for each communication path.

Network Control Functions

The Network Control Functions are those that control, allocate, and manage the resources of the physical network. Each Routing Point has a set of the foregoing functions in the Route Controller (305) and uses it to facilitate the establishment and the maintenance of the connections between users applications. The Network Control Functions include in particular:

- Directory Services for retrieving and maintaining information about network users and resources.
- Bandwidth Management for processing the bandwidth reservation and maintenance messages, and for monitoring the current reservation levels on links.
- Path Selection for choosing the best path for each new connection considering the connection requirements and the current link utilization levels.
- a Control Spanning Tree for establishing and maintaining a routing tree among the network nodes, to distribute control information (in parallel) including link utilization, and for updating the Topology Database of the nodes with new network configurations or link/node failures.
- a Topology Update for distributing and maintaining, in every node, information about the logical and physical network (including link utilization information) using the Spanning Tree.
- Congestion Control for enforcing the bandwidth reservation agreements between the network's users and the network which are established at the call set-up time, and for estimating actual bandwidth and for adjusting reservation if necessary during the life of the connection.

Congestion Control

The Network Control Functions provide a quality of service guarantee and when required, a bandwidth guarantee to every transport connection established across the network. When a transport connection with specified bandwidth is set-up, an interaction between the network and the connection initiator results in either a guaranteed bandwidth being reserved for this connection or the connection being blocked due to lack of network resources. Once the set-up is complete and the transmission starts, the congestion control mechanism ensures that the traffic going into the network stays within the allocated bandwidth by controlling its burstiness and ensuring some long term average bit rate for the link. When a connection specifies a required bandwidth at connection set-up time, it requires its own congestion control mechanism, and it is assigned to a network connection of its own. The basic preventive congestion control strategy consists of a leaky bucket operating at the access node of each connection with the objective of guarantying users that their reserved level of traffic will cross the network with bounded delay and with an extremely small probability of packet loss due to congestion in intermediate nodes (in the order of $10^{-6}$). The simplest way to provide for low/no packet loss would be to reserve the entire bandwidth of the user connection. For bursty user traffic, however, this approach can waste a significant amount of bandwidth across the network. Thus, an approach is to reserve a bandwidth amount equal to the "equivalent capacity" needed by the user. The basic idea is that the reservation mechanism derives a level of reservation from the knowledge of the source characteristics and of the network status. This reservation level falls somewhere between the average bandwidth required by the user and the maximum capacity of the connection. For more bursty connections this reservation level needs to be higher than it is for less bursty connections to guarantee the same discard probability.

Because most traffic flows on bandwidth reserved connections, it is essential to estimate the required bandwidth for users who can't do it themselves. For example it would be extremely difficult for customers to define the required bandwidth for traffic entering the network from a LAN server. Thus, considerable work has been done to estimate the user traffic and the utilization of the links and to determine what measurements to take and what filters to use to determine when and how to change the leaky bucket parameters for a detected change in user bandwidth requirements. The congestion control mechanism monitors user traffic streams and makes changes to the reserved bandwidth when necessary either to guarantee the loss probability as user demand increases or to use bandwidth more efficiently as user demand decrease. It is recognized that a particular challenge in this regard is to avoid adjusting bandwidth reservation too often, because significant changes could require new path selection and bandwidth management flows across the network and frequent changes could lead to a network thrashing condition.

Connection Request

In order to transmit packets on the network, it is necessary to calculate a feasible path or route through the network from the source node to the destination node for the transmission of such packets. To avoid overload on any of the links on this route, the route is calculated in accordance with an algorithm that insures that adequate bandwidth is available for the new connection. One such algorithm is disclosed in U.S. Pat. No. 5,233,604 entitled "Method and Apparatus for Optimum Path Selection in Packet Transmission Networks" (Ahmadi et al.). Once such a route is calculated, a connection request message is launched on the network, following the computed route and updating the bandwidth occupancy of each link along the route to reflect the new connection.

Figure 7:
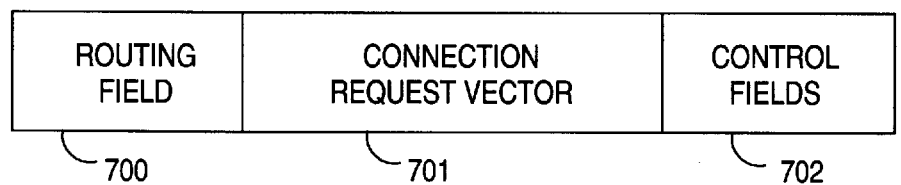
FIG. 7 shows a connection request message which might be used to set-up initial connections and dynamically altered connections using the dynamic traffic management mechanism of the present invention.

FIG. 7 shows a graphical representation of a connection request message to be launched from a source node to a destination node along a pre-calculated route. The connection message comprises a routing field (700) which includes the information necessary to transmit the connection message along the pre-calculated route. Also included in the connection request message is a connection request vector (701) which characterizes the important statistical characteristics of the new packet source and which allows this new source to be statistically multiplexed with the previously existing signals on each link of the route. As will be discussed in detail hereinafter, the connection request vector includes a relatively few parameters necessary to adequately characterize the packet source. As described in U.S. Pat. No. 5,311,513 entitled "Rate-based Congestion in Packet Communications Networks" (Ahmadi et al.), these parameters might include:

R the maximum bit rate for the source, m, the mean of that bit rate, and b, the equivalent burst duration of packets from that source.

The values in the connection request vector are used to test each link of the route to determine if the new connection can actually be supported by that link, and to update, separately for each link, the link occupancy metric for that link to reflect the addition of the new connection. If the link occupancy has changed since the route was calculated, the connection may be rejected at any node along the route, and the source node notified of the rejection. Finally, the control fields (702) include additional information used in establishing the connection, but which is not pertinent to the present invention and will not be further discussed here. Note that, when a connection is to be taken down, a connection removal message having the same format as FIG. 7 is transmitted along the route of the connection to be removed. The link occupancy of each link is then updated to reflect the removal of this connection by subtracting the metrics for the removed connection.

Source Bandwidth Management

Figure 1:
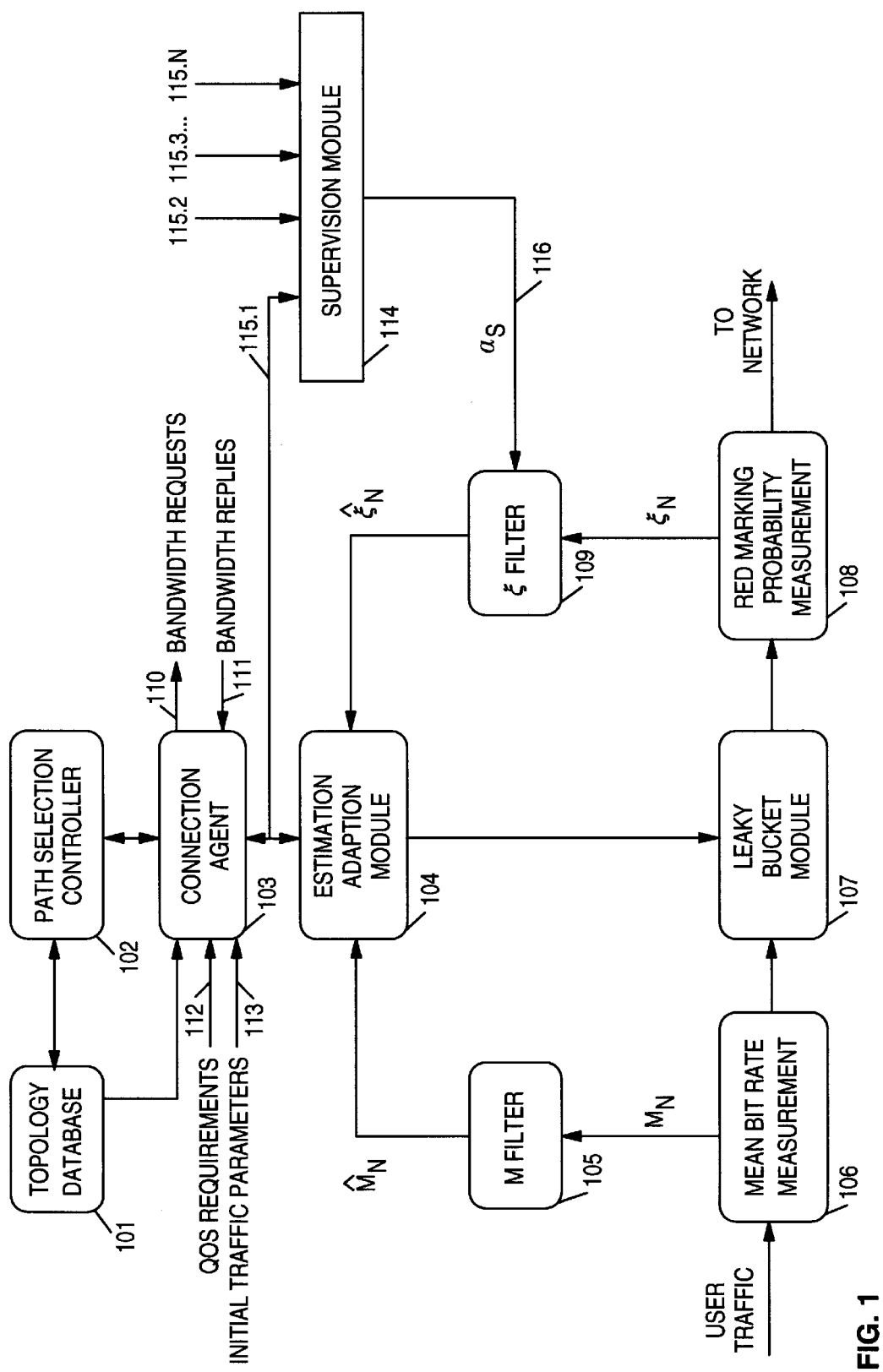
FIG. 1 shows a general representation of the dynamic traffic management mechanism according to the present invention.

The Source Bandwidth Management system shown in FIG. 1 is provided for each source of user traffic to be applied to the network (200). These bandwidth management systems are located in the access nodes and one such a system is provided for each direction of transmission between two communicating users. Although such systems can be realized with hard-wired circuit components, the preferred embodiment utilizes a programmed computer since such an implementation is more readily modified to accommodate improvements and to reflect changes in traffic patterns.

Before proceeding further to a detailed description of the Source Bandwidth Management shown FIG. 1, the following variables will be defined:

R: The maximum bit rate, in bits per second, of the input traffic as requested by the user source to initiate the connection.

m: The mean bit rate, in bits per second, of the input traffic as requested by the user source to initiate or to adapt the connection.

b: The mean burst duration, in seconds, of the input traffic as requested by the user source to initiate or to adapt the connection.

t: The sampling period of both m and $\xi$ Filters (105 and 109). Filters receive measurements and report filtered outputs $\hat{m}_n$ and $\xi_n$ to the Estimation and Adaptation module (104) every t seconds.

$m_n$: The raw measurement of the mean bit rate of the input traffic for the nth sampling period of duration t.

$\xi_n$: The raw measurement of the red marking probability being observed in the Leaky Bucket module (107) during the nth sampling period of duration t.

$\hat{m}_n$: The filtered value of the mean bit rate m, as filtered by bit rate m Filter (105) of FIG. 1, for the input traffic at the end of the nth sampling period.

$\xi_n$: The filtered value of the red marking probability, as filtered by red marking probability $\xi$ Filter (109) of FIG. 1 for the leaky bucket at the end of the nth sampling period.

γ: The green token generation rate currently used in the Leaky Bucket module (107) of FIG. 1. The green token rate determines the rate at which packets marked green can be injected into the network. It is assumed that a bandwidth amount of γ (equivalent capacity) has been reserved in the network for this connection.

M: The maximum size of the green token pool in the Leaky Bucket module (107) of FIG. 1. The size of the green token pool determines the length of green packets injected into the network.

Connection Agent Module

As described in FIG. 1, in connection with FIG. 2, when a new connection is to be set-up through network (200), an initial estimate of the traffic characteristics is made by the packet source. This estimate arrives at the bandwidth management system of FIG. 1 on link (113) together with the quality-of-service (QOS) requirements on link (112). Such quality-of-service requirements include among other things: acceptable loss probabilities, acceptable delays, and real-time delivery requirements.

A Connection Agent (103) passes these connection requirements on to Path Selection Controller (102). The latter uses these requirements, together with the up-to-date network description stored in the Topology Database (101), to calculate a bandwidth (equivalent capacity) γ and a connection path through network (200) satisfying all of these requirements. One optimum Path Selection Controller is described in U.S. Pat. No. 5,233,604 entitled "Method and Apparatus for Optimum Path Selection in Packet Transmission Networks" (Ahmadi et al.). Once calculated, the proposed connection path is encoded in a Connection Request Message such as the message shown in FIG. 7 and is launched as a bandwidth request on link (110) onto the network (200). The bandwidth request message of FIG. 7 traverses the calculated connection path and, at each node along the route, is used to reserve, in the next link of the connection, the bandwidth required to satisfy the connection request.

If sufficient bandwidth is available in each link of the connection along the computed path, the destination node receives the request and transmits back an acceptance of the new connection. If, at any link along the route, insufficient bandwidth is available due to changes in the traffic patterns, a denial of the connection request is transmitted back to the source end node.

These bandwidth replies, whether negative or positive, are delivered back to Connection Agent (103) on link (111). If the connection is denied, the user source is notified and another attempt at the connection can be made later. If the connection is accepted, Leaky Bucket Module (107) is activated and supplied with the appropriate parameters to control the access of the user traffic. The user then begins introducing traffic.

Leaky Bucket Module

The source bandwidth management system comprises a Leaky Bucket module (107) to which the user traffic on input link is applied. The output of Leaky Bucket module (107) is applied to the network (200) of FIG. 2. In the Leaky Bucket module (107), packets are launched into the network with one of at least two different priority classes, conventionally called "red" and "green", where green is the higher priority.

Green packets are guaranteed a pre-specified grade of service based on an acceptable level of delay and loss probability within the network. Red packets do not have the same guarantees and are discarded before the green packets when congestion occurs.

Strategies for optimally marking packets in a leaky bucket mechanism are disclosed in U.S. Pat. No. 5,311,513 entitled "Rate-based Congestion Control in Packet Communications Networks" (Ahmadi et al.). The function of the Leaky Bucket module (107) is to "shape" the traffic before it enters the network (200). User packets not conforming to the initially provided statistical description, are marked red or discarded. For a connection that is characterized by its peak rate R, its mean rate m, and its average burst duration b, four parameters are computed and used in the Leaky Bucket module (107) to control that the bandwidth demand of the connection does not exceed the amount of bandwidth that has been actually reserved in the network for this connection.

\* γ Green Token Generation Rate
Its value is determined by relation (1):

$$\gamma = R\frac{y - X + \sqrt{(y - X)^2 + 4X\rho y}}{2y}$$

where

X is the amount of buffer space (in bits) available on each Trunk adapter (304) along the path of the connection.

ε is the target maximum packet loss probability in the network, y=ln(1/ε)b(1−ρ)R, and ρ=m/R (ρ denotes the utilization of the source).

For simplicity, it is assumed that all the buffer sizes are the same(X) and that the target maximum packet loss probabilities for each link are the same, ε.

\* M: Maximum Green Pool Size
Its value is determined by relation (2):

$$M = \text{Max}\left[\frac{b(R - m)(R - \gamma)\gamma}{(\gamma - m)R} \ln \frac{R(\gamma - m) + (\xi_T m(R - \gamma)}{(\xi_T \gamma(R - m)}, \text{Maxpacket}\right]$$

where $\xi_T$ is the target red marking probability (in the preferred embodiment, $\xi_T$=0.01), and Max_packet represents the maximum size of a packet at the network access.

\* $\gamma_R$: Red Token Generation Rate
Its value $\gamma_R$ is set to a fraction of the green token generation rate. In the preferred embodiment, this fraction is set to 10% γ is given by relation (3):

$$\gamma_R = 0.1\ \gamma$$

\* $M_R$: Maximum Red Pool Size
Its value is determined by relation (4):

$$M_R = M$$

At the establishment of the connection, a bandwidth amount γ is reserved in the network by the Connection Agent module(103) and the leaky bucket parameters are initialized.

The green token pool is set to its maximum value M as given by relation (2), and is continuously refreshed at the rate γ given by relation (1): the pool receives y bits per second.

Similarly, the red token pool is set to its maximum value $M_R$ as given by relation (4), and is continuously refreshed at the rate $\gamma_r$ given by relation (3).

For each new incoming packet, the Leaky Bucket module (107) checks whether there is enough green token in its green pool. If yes, then the packet is tagged "green" and is immediately transmitted to the network. Else, the Leaky Bucket module (107) checks whether the red pool contains enough tokens. If yes, the packet is tagged as discardable ("red") and transmitted to the network. Else, it is discarded, or optionally spaced for a period that would allow the pool to contain enough green or red token to allow the packet to be transmitted.

If the traffic characteristics remain within the initially negotiated values, however, the red marking mechanism is sufficiently limited to insure the promised loss probability. If the incoming traffic characteristics depart substantially from the negotiated values, Estimation and Adaptation module (104) is invoked to take corrective actions, to either increase or decrease the bandwidth reservation as will be discussed later.

Estimation and Adaptation Module

When the connection is accepted, the Leaky Bucket module (107) is activated and the user then begins introducing traffic. At the same time, Estimation and Adaptation module (104) begins monitoring this incoming traffic to determine if any significant changes in the incoming traffic characteristics have occurred during the life of the connection. If so, Estimation and Adaptation module (104) notifies Connection Agent (103) to request a new bandwidth allocation, supplying Connection Agent (103) with the new traffic parameters required for the connection. As before, Connection Agent (103) launches a new bandwidth request on link (110) requesting a bandwidth adjustment for said connection. If the adjustment is accepted, the leaky bucket paramters are updated with the new traffic characteristics and Estimation and Adaptation module (104 continues to monitor the incoming traffic, but with the new characteristics.

Note that only a new bandwidth allocation is requested, rather than a new connection. This saves the overhead involved in taking down the old connection and setting up a new connection. If the requested additional bandwidth is not available, the connection can be either taken down or given a lower priority, depending on the original negotiations with the sending party at the source node.

Bandwidth Measurement and Filtering

Referring to FIG. 1, measuring the mean bit rate $m_m$ of the incoming traffic in Measurement module (106) is simple. A counter counts the number of bits received during the sampling period t and divides this number by the length t. Similarly, the red marking probability $\xi_n$ is equal to the number of packets marked red during the sampling period t divided by the total number of packets transmitted during the period t. These raw data are delivered to the m filter (105) and the $\xi$ Filter (109), the latter being a low pass filter, every t seconds. The function of the m and $\xi$ Filters (105 and 109) is to filter out transient changes in mean bit rate $m_n$ and red marking probability $\xi$. The filters (105) and (109) report estimates of mean bit rate and red marking probabilities, respectively, every t second. Each filter (105) or (109) maps the current raw measurement and all of the previous measurements into an estimate of the filtered value. Let $x_1, x_2, \ldots, x_n$ be the raw measurements and $\hat{x}_1, \hat{x}_2, \ldots, \hat{x}_n$ be the estimates (where x is either m or $\xi$). While the mapping of filters (105) and (109) can be any function, in the preferred embodiment of the present invention, this mapping is exponential. The nth estimate $\hat{x}_n$ is given by:

$$\hat{x}_n = \alpha \hat{x}_{(n-1)} + (1-\alpha) x_n$$

where the filter parameter $\alpha$, lying between zero and one ($0 < \alpha < 1$), determines the relative reliability of the two terms in the above equation. The value of $\alpha$ is set to a constant equal to 0.8 for the m Filter (105). For the $\xi$ Filter (109), the value of $\alpha$ on whether the raw value $\xi_n$ is greater than the filtered value $\hat{\xi}_n$:

if $\hat{\xi}_n < \xi_n$, then $\alpha = 0.8$ (nominal value), else $a = a_s$, where $\alpha_s$ is a parameter provided by the Supervision module (114) on link (116) as explained later.

Filtered values $\hat{m}_n$ and $\hat{\xi}_n$ of the mean bit rate and the red marking probability are delivered to the Estimation and Adaptation module (104) once every t seconds. These filtered values are compared in the Estimation and Adaptation module (104) to acceptable values to determine whether or not an adaptation is required, that is a new connection request is warranted. This comparison will be discussed in connection with the adaptation region disclosed graphically in FIG. 4.

Adaptation Regions

Figure 4:
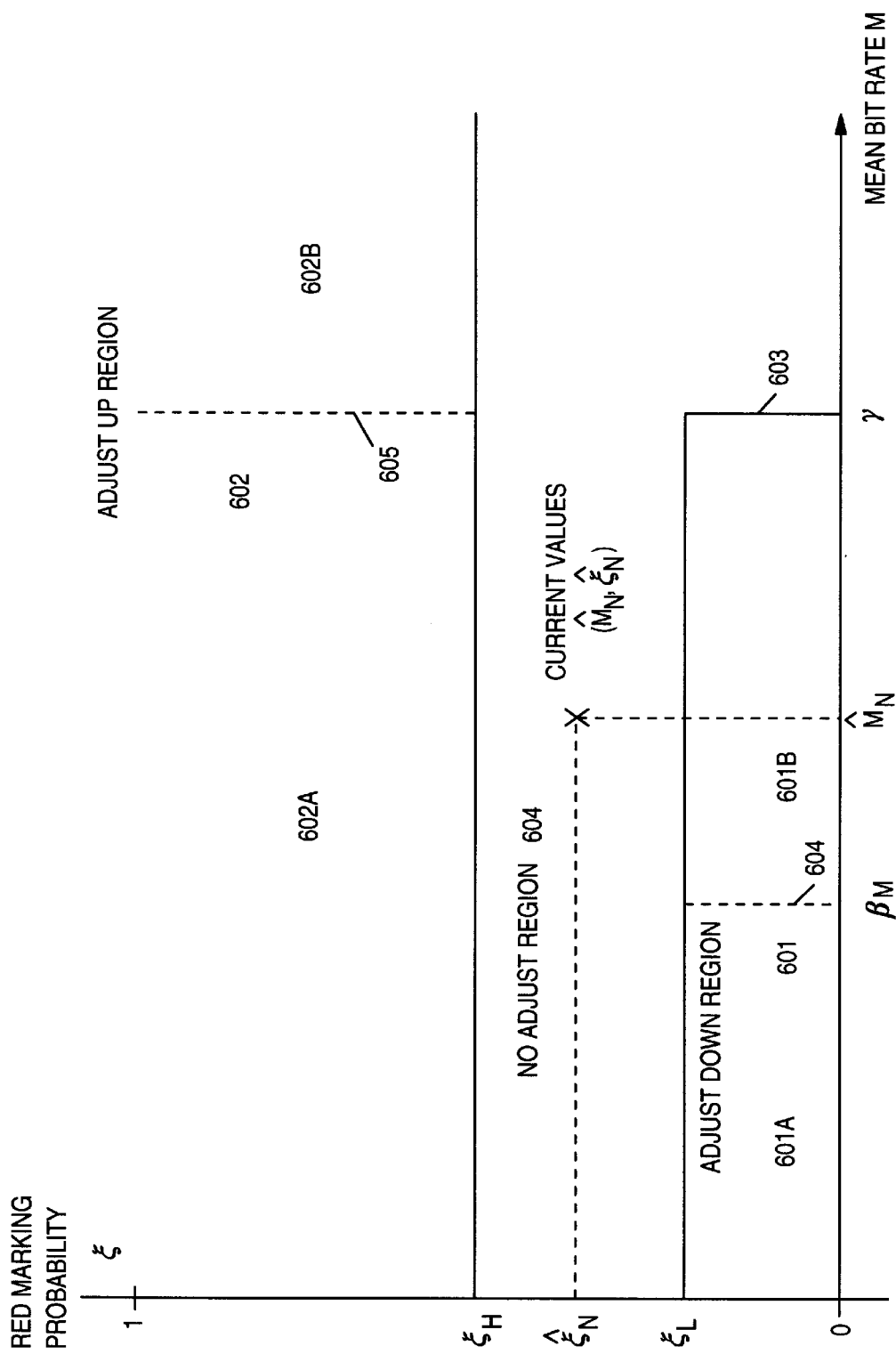
FIG. 4 shows a graphical representation, in the mean bit rate/effective burst duration plane, of the adaptation region outside of which new connection parameters are requested for an existing connection in accordance with the present invention.

FIG. 4 shows the regions used to adapt the bandwidth of a connection in response to changes in the mean bit rate m and/or the red marking probability $\xi$ as they are estimated at the network port by means of modules (106), (105), (108), and (109) detailed above. FIG. 4 includes three regions in a two dimension plane:

Adjust-up region (602) defined by:

$$\xi_n > \xi_H$$

where $\xi_H$ is a constant, which is equal to $5.10^{-2}$ in the preferred embodiment. Region (602) is further divided into two sub-areas:

* for $m_n \leq \gamma$ (602a)
* for $m_n \leq \gamma$ (602b)

Adjust-down region (601), defined by:

$$\xi_n < \xi_L$$

$$m_n < \gamma$$

where $\xi_L$ is a constant equal to $10^{-2}$ in the preferred embodiment. Region (601) is further divided into two sub-areas:

* for $m_n \leq \beta.m$ (601a)
* for $m_n > \beta.m$ (601b)

where $\beta$ is a constant equal to 0.3 in the preferred embodiment.

Dynamic Bandwidth Adaptation

Figure 5:
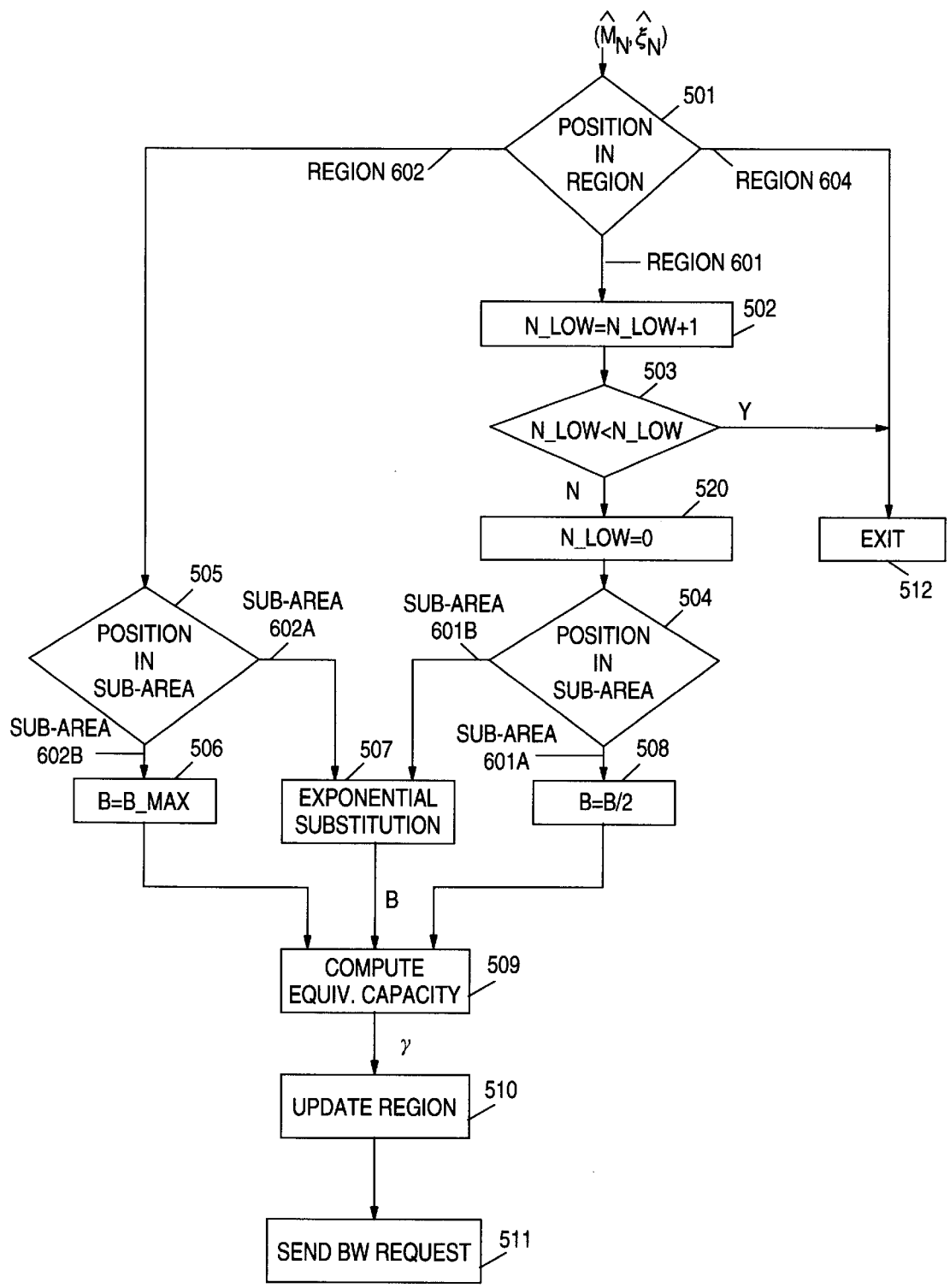
FIG. 5 shows a flow chart of the process for dynamically adapting bandwidth using the adaptation region illustrated in FIG. 4.

Every t seconds, the Estimation and Adaptation module (104) checks the position of the filtered values $m_n$ and $\xi_n$ and in accordance with the adaptation regions, decides to either adjust up or down, or not adapt the connection bandwidth. This decision is taken according to the algorithm shown in FIG. 5.

*(501) A test determines where the point of coordinates $(m_n, \xi_n)$ lies on the plane.

(512) If the point lies in the "no-adjust" region (604), then no adaptation is attempted and the algorithm is completed.

(505) If the point lies in the "adjust up" region (602), then a second test (505) positions the point $(m_n, \xi_n)$ in one of the sub-areas:

(507) If the point lies in sub area (602a), then a new value of the burst parameter b is estimated by means of the exponential substitution method disclosed in U.S. Pat. No. 5,359,593 entitled "Dynamic Bandwidth Estimation and Adaptation for Packet Communications Networks" (Derby et al.) b is given by relation (5):

$$b = \frac{\frac{M(\gamma - \hat{m}_n)R}{(R - \hat{m}_n)(R - \gamma)\gamma}}{\ln\left[\frac{R(\gamma - \hat{m}_n) + \hat{\xi}_n \hat{m}_n(R - \alpha)}{\hat{\xi}_n \gamma(R - \hat{m}_n)}\right]}$$

*(506) If the point lies in sub-area (602b), then a new value of the burst parameter b is computed:

b=b__max where b__max is the maximum burst size that is supported by this implementation. In the preferred implementation b__max=10 ms.

(502) If the point lies in the "adjust-down" region 601), then a counter n__Low is incremented and tested (503).

(512) If the updated value of the counter is less than a constant N__Low taken to 5 in the preferred embodiment, then the algorithm is completed. The incrementation of the counter (502) and the test (503) avoid making too fast adjust-down decisions during transient states.

(504) If the point lies in the "adjust-down" region (601) for N__Low periods t, then a test (504) determines the position of the point in one of the two sub-areas (601a) or (601b).

(508) If the point lies in sub-area (601a), then a new value of the burst parameter b is computed:

b=b/c where c is a constant >1 (c=2 in the preferred embodiment).

(507) If the point lies in sub-area (601b), then a new value of the burst parameter b is computed by means of equation (5).

(509) Once a new value of the burst parameter b has been determined either in steps (506), (507) or (508), a new value of the green token generation rate γ is computed:

$m = m_n$ $$\gamma = R\frac{y - X + \sqrt{(y - X)^2 + 4X\rho y}}{2y}$$

(510) Then, the regions of FIG. 4 are updated:
the upper boundary (603) of the "adjust-down" region (601) and the medium boundary (605) of the "adjust-up" region (602) are set to the new value of γ, and
the medium boundary (604) of the "adjust-down" region (601) is set to β.m.

(511) The bandwidth request message of FIG. 7 is sent out on link (110) to the network and is delivered to every node on the path for adjusting the bandwidth reserved to the connection.

Adaptation Control and Fairness for Multiple Connections

The above described algorithm is an improvement for large and fast traffic variations of the method and system disclosed in U.S. Pat. No. 5,359,593 entitled "Dynamic Bandwidth Estimation and Adaptation for Packet Communication Networks" (Derby et al.). In particular, the present invention supports two important features: a global control of the number of connections that can be adapted by the processor, given its processing capability, and a fairness between connections. These features are supported thanks to a Supervision module (114), implemented on top of the dynamic traffic management mechanism as shown in FIG. 1.

Adaptation Control

The global control of the number of connections is implemented as follows. At each sampling period t, the Supervision module (114) receives n bandwidth requests on links (115.1), (115.2), . . . , (115.N), with:

$0 \leq n \leq N$ where N is the total number of connections served by the processor.

The average number $\tilde{n}$ of bandwidth requests in the last periods is estimated by a filtering operation to:

$\tilde{n} = 0.99 \pm \tilde{n} 0.01n$

Then the filtered value $\tilde{n}$ is checked against predefined thresholds. Let $N_o$ be the processing capability of the processor (number of adaptations per seconds), the following tests are performed:

if $\tilde{n} < 0.25 N_o$, then $\alpha_s = 0.4$: the filter coefficient $\alpha_s$ is relaxed to a very loose value that enables fast variations of the average red marking probability as estimated by the ξ (low pass) Filter (109).

if $0.25 N_o \leq \tilde{n} \leq 0.5 N_o$ then $\alpha_s$ 0.6: $\alpha_s$ is set to a loose value that makes variations of the red marking probability $\xi_n$ slower.

if $0.5 N_o \leq \tilde{n} \leq 0.75 N_o$, then $\alpha_s = 0.8$: $\alpha_s$ is set to its nominal value.

if $0.75 N_o \leq \tilde{n}$, then $\alpha_s = 0.95$: $\alpha_s$ is set to a tight value which virtually freezes the average red marking probability $\xi_n$, so that displacements in the plane of FIG. 4 become very slow.

Figure 6:
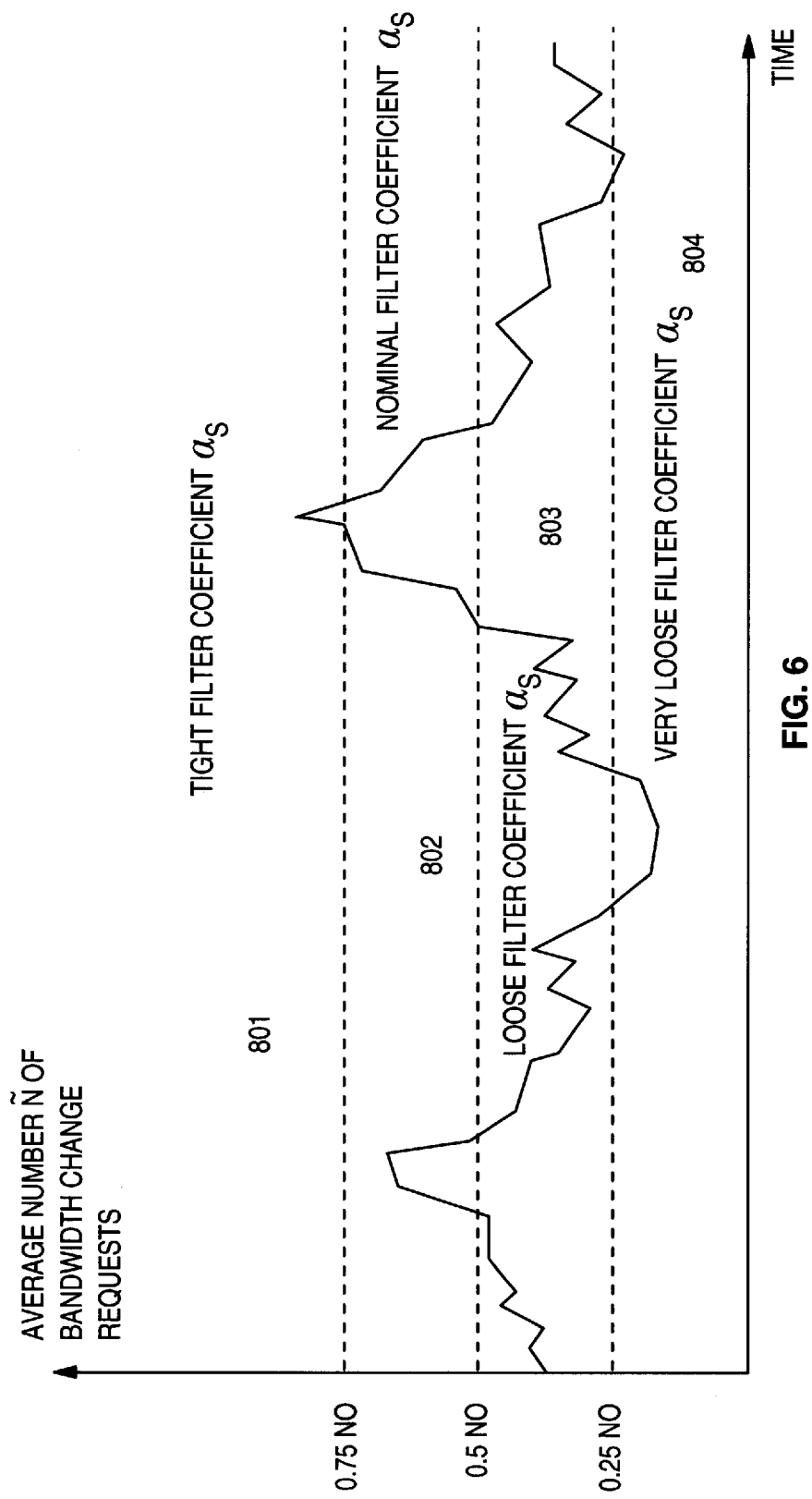
FIG. 6 shows a graphic representation of the flow control implemented by the Supervision module according to the present invention.

The coefficient $\alpha_s$ is then forwarded to the red marking probability ξ Filter (109) via the line (116) for tuning its characteristics. This operation increases the fairness among connections. Indeed if a connection is much more demanding than the others in term of number of bandwidth adjustments per time unit, the coefficient s computed by the Supervision module (114), will increase, and therefore the trajectory of the connections in the adjust down region (601) of FIG. 4 will take more time, which will in turn force the average number of bandwidth adaptations per second to converge to $N_o$. FIG. 6 graphically illustrates the principle of the Supervision module and shows the time variations of the average number $\tilde{n}$ of bandwidth requests. Four regions are defined for controlling the filter parameter $\alpha_s$ according to the above algorithm:

* region (801), for very tight filter coefficient $\alpha_s$,
* region (802), for tight filter coefficient $\alpha_s$,
* region (803), for nominal filter coefficient $\alpha_s$,
* region (804), for loose filter coefficient $\alpha_s$.

Adaptation Fairness

The fairness between connections is implemented as follows. For each connection i supported by the adapter ($0 \leq i \leq N$), the processor maintains a fairness variable $F_i$, which reflects the current behavior of this connection. This fairness variable is initialized at the connection set-up by:

$F_i = 1/N_o$,

At each sampling period t, the processor performs the following operations for every connection (i=1, ..., N):

First, the fairness variable $F_i$ is updated $F_i = 0.99 F_i$ if connection i does not require a new bandwidth request, or $F_i = 0.99 F_i + 0.01$ if connection requires a new bandwidth request.

Second, the fairness variable $F_i$ is tested. If $F_i > \delta/N_o$, where $\delta$ is a constant equal to 1 in the preferred embodiment, then the connection i is no longer considered as a fair connection and as such should not be adapted, whatever its bandwidth demand, until the counter $F_i$ decreases below the limit $\delta/N_o$.

This mechanism ensures fairness between connections in the sense that it prevents a single connection to use on the average a portion of the processor computational capacity greater than $1/N_o$, that can be called the processor per connection fair share. A value of $\delta$ greater than 1 can be used to overbook the processor resource.

We claim:

1. A method for dynamically controlling access by data sources to a packet data communication network interconnecting source and destination nodes, each source node having at least one management system for controlling access to the network by a data source connected to the source node, including for each said data source the steps of:

measuring the mean bit rate of the traffic emanating from the data source;

controlling the flow of data packets from the data source into the network;

measuring the loss probability of data packets introduced into the network;

performing a low pass filter operation on the loss probability measurements;

defining adaption regions based on the simultaneous mean bit rate and loss probability measurements;

in response to pairs of said mean bit rate and loss probability measurements falling outside the adaption regions, requesting modification of the bandwidth allocated to the transmission of data packets;

measuring the average number of bandwidth modification requests; and modifying the characteristics of the low pass filtering step as a function of the average number of bandwidth modification requests.

2. The method according to claim 1 wherein said step of measuring an average number of bandwidth modification requests comprises the further step of:

filtering said average number of bandwidth modification request measurements.

3. The method according to claim 1 wherein: the more the average number of bandwidth modifications requested for the same processor increases, the more the bandwidth of the low pass filter (109) decreases.

4. The method according to claim 1 wherein the more often a connection requires modification of its allocated bandwidth, the less the management system gives priority to said requests, and the less often a connection requires modification of its allocated bandwidth, the more the link processor gives priority to said requests.

5. In a packet data communication network for interconnecting source and destination nodes, at least one management system, each for controlling access to the network by a data source connected to the source node comprising:

means for measuring the mean bit rate of the traffic emanating from the data source;

a leaky bucket circuit for controlling the flow of data packets from the data source into the network;

means for measuring the loss probability of data packets introduced into the network;

a low pass filter for filtering the loss probability measurements;

means for defining adaption regions based on the simultaneous mean bit rate and loss probability measurements;

means responsive to pairs of said mean bit rate and loss probability measurements falling outside the adaption regions for requesting modification of the bandwidth allocated to the transmission of data packets;

means for measuring the average number of bandwidth modification requests; and means for modifying the characteristics of the low pass filter as a function of the average number of bandwidth modification requests.

6. A communications network according to claim 5 further comprising means for filtering said average number of bandwidth modification request measurements.

* * * * *